United States Patent [19]

Silvestri

[11] 4,095,323
[45] Jun. 20, 1978

[54] GEAR TOOTH ALIGNMENT BY STRAIN

[76] Inventor: Giovanni Silvestri, 4 Meadowbrook Dr., Barrington, R.I. 02806

[21] Appl. No.: 798,061

[22] Filed: May 18, 1977

[51] Int. Cl.² .................. B23P 15/14; B23P 19/00
[52] U.S. Cl. .................................. 29/159.2; 29/434; 74/410; 74/801; 228/155
[58] Field of Search .............. 29/159.2, 469, 434; 74/410, 411, 801; 228/155

[56] References Cited

U.S. PATENT DOCUMENTS

| | | | |
|---|---|---|---|
| 3,144,790 | 8/1964 | Davis, Jr. et al. | 74/410 X |
| 3,241,392 | 3/1966 | Hardy | 74/801 X |
| 3,245,279 | 4/1966 | Baker | 74/410 |
| 3,355,789 | 12/1967 | Tetsull | 29/159.2 |
| 3,750,263 | 8/1973 | Satzler et al. | 29/159.2 X |

*Primary Examiner*—Victor A. DiPalma

*Attorney, Agent, or Firm*—Richard S. Sciascia; Arthur A. McGill; Prithvi C. Lall

[57] ABSTRACT

Apparatus and method for gear tooth alignment by strain in order to minimize unbalanced loading of the gear teeth of a two stage parallel or branched gear system. Two hardened and separately ground gears are fitted with an easy fit between the shaft of one gear and the bore of the other and welded to make a compact cluster. The welded area develops a weakness resulting from being annealed due to heating in the welded zone. After assembling, the output shaft is locked to the gear train structure, the input gear is loaded slightly greater than the designed maximum load, causing the stress to exceed the yield point at the annealed welded area. A permanent deformation of all gears results with work hardening of the welded area during one cycle and a desired permanent repositioning of the teeth occurs resulting in reorientation of the gear teeth of the gears in mesh in the cluster.

3 Claims, 4 Drawing Figures

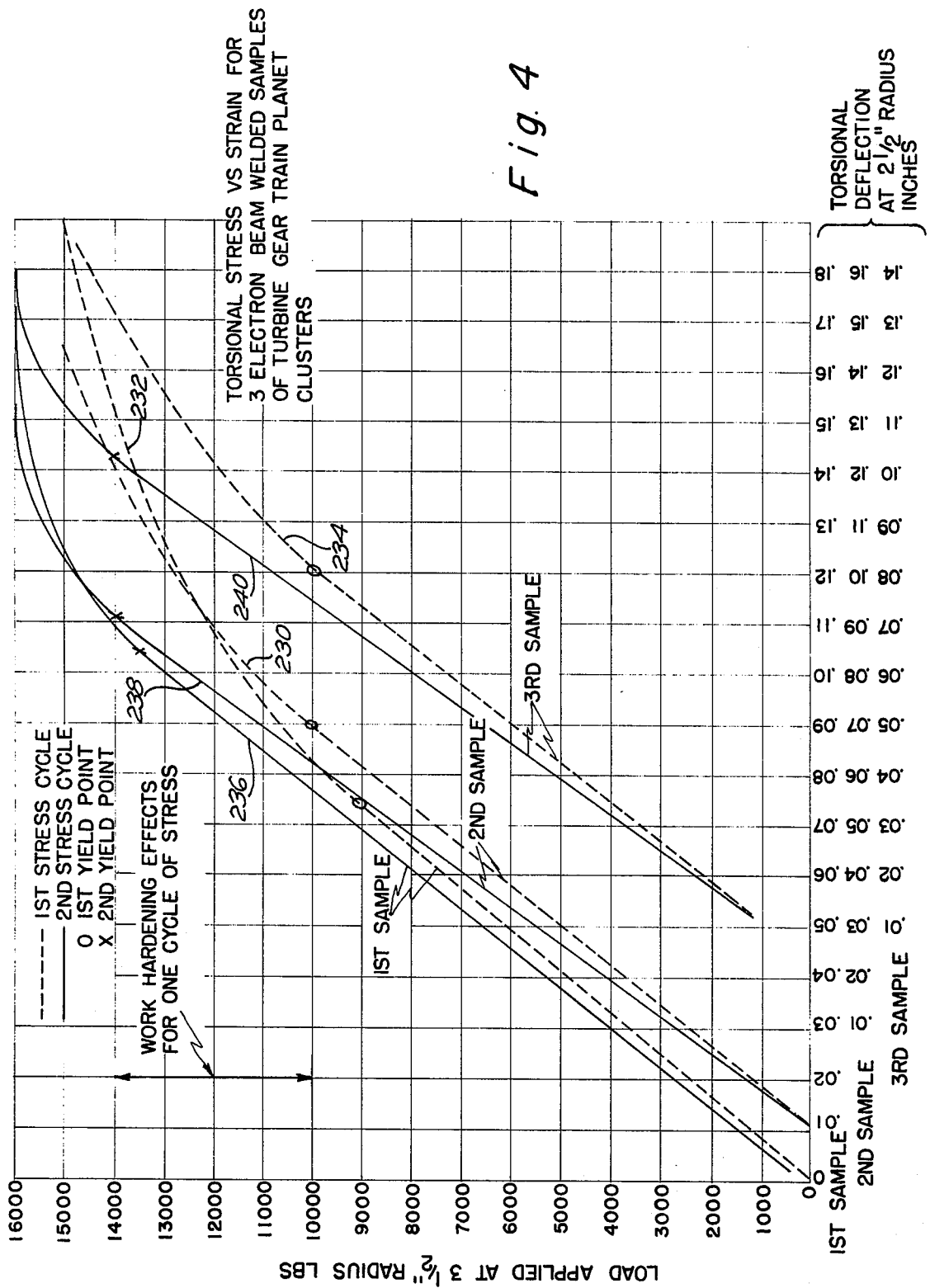

GEAR TOOTH ALIGNMENT BY STRAIN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This application is co-pending with my eight other patent applications related to a turbine-gear train system describing and claiming various aspects thereof.

This invention relates to a gear train system and more particularly to a means of changing the effective tooth positional accuracy between a gear and a pinion on the same shaft when used with other like units in a parallel or a branched gear system of more than one stage.

When power is transmitted between two stages of any parallel or branched gear system; including an epicyclic, a star or a parallel arrangement of more than one stage; any misalignment between the teeth of the first stage gear and the second stage pinion when assembled in the gear train, causes unbalance loading of the gear teeth. The magnitude of the unbalanced load will be a function of the stiffness of the shaft between the gears, the stiffness of the teeth and the extent of the misalignment. In the past, the first-to-second stage clusters have generally been made as a single member and stringent machining accuracy has been used to result in reasonable positional accuracy. This can be done when the stresses permit machining processes which do not include hardening and grinding and are therefore limited to low-load applications. However, when such systems require limited life, lightweight and high loads, the need for very high wear and bending strength and for optimum load distribution makes use of hardened and ground gears mandatory and forces the cluster to be made of two pieces which are then joined. However, this joining of two pieces amplifies the positional inaccuracy unless tolerated by some other means. It is thus desirable to correct for the positional inaccuracy caused by joining of two pieces in such a gear system used for high loads.

SUMMARY OF THE INVENTION

The method and apparatus of gear tooth alignment by strain so as to minimize unbalanced loading of the gear teeth of a two stage parallel or branch gear system includes hardening and separately grinding of two gears which are fitted with a transition or easy fit between the shaft of one gear and the bore of the other and welded to make a compact cluster. The welded area develops a weakness resulting from being annealed due to the heating in the welded zone. After assembling into a cluster, the output shaft is locked to the gear case and the input gear is loaded torsionally to slightly greater than the designed maximum loading, causing the stress to exceed the yield point of the shaft material in the welded area and resulting in a permanent rotational deformation of all gears. The welded area is strain hardened during one cycle so that subsequent loading in actual operation will not exceed the apparent yield strength and results in the repositioning of the teeth by virtue of the permanent deformation realized.

An object of subject invention is to have a gear tooth alignment technique which distributes loads evenly.

Another object of subject invention is to have a gear tooth alignment technique which requires minimum dimensional control on the gear cluster manufacture.

Still another object of subject invention is to allow a gear tooth alignment technique which permits reestablishment of a high yield strength in a welded joint area by virtue of a single strain cycle to stresses above the annealed yield strength of the material used.

Other objects, advantages and novel features of subject invention will become apparent from the following detailed description of the invention when considered in conjunction with the accompanying drawings wherein:

BRIEF DESCRIPTION OF THE DRAWINGS

FIG. 4 is a graphical representation of a relationship between torsional stress versus strain for electron beam welded areas of the planet cluster of a turbine-gear train system.

DESCRIPTION OF A PREFERRED EMBODIMENT

Figure 1:
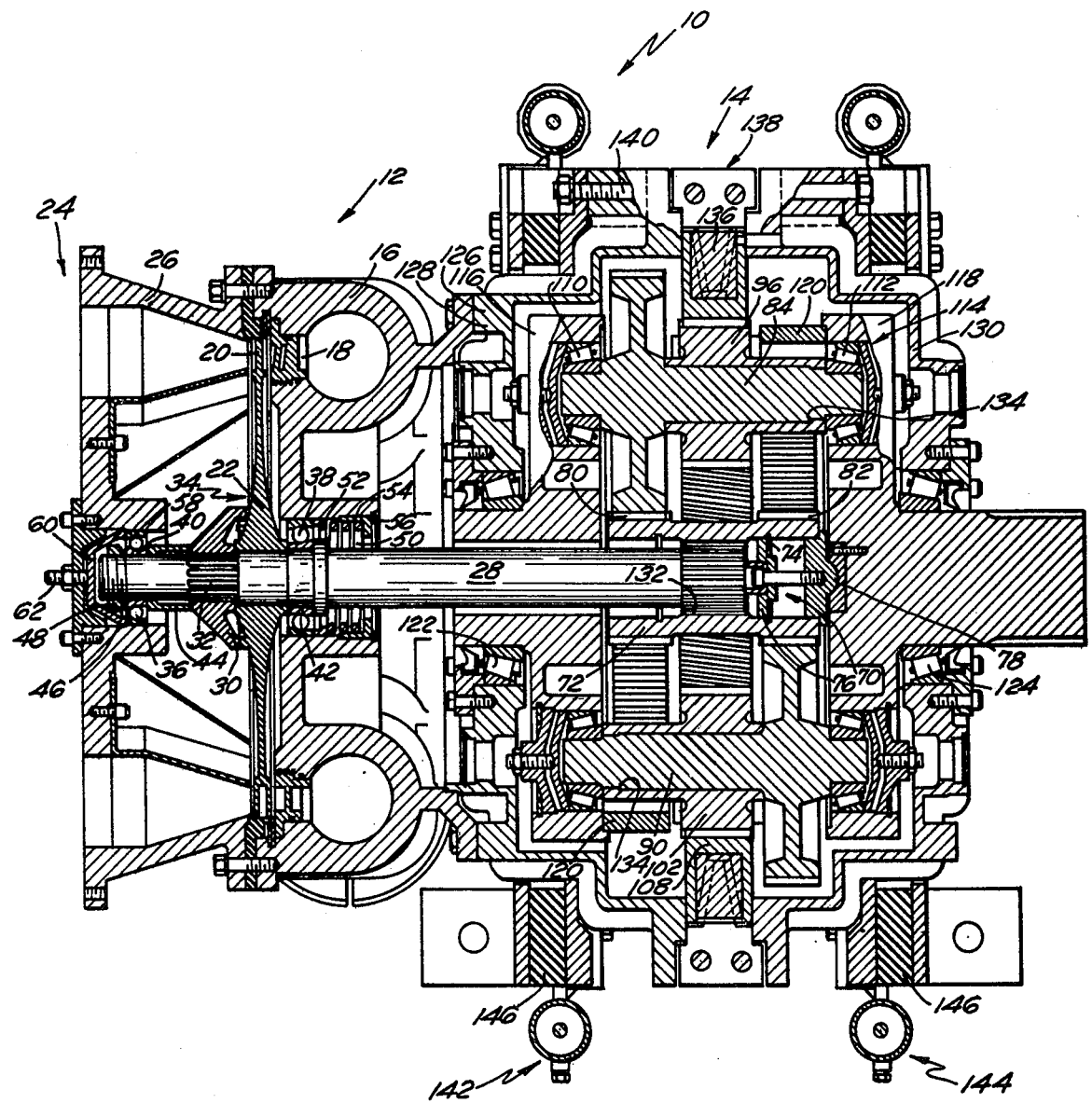
FIG. 1 is a multi-cross sectional view of a high pressure air turbine-gear train system which uses an arrangement for compensating for positional inaccuracy according to the teachings of subject invention.
Figure 2:
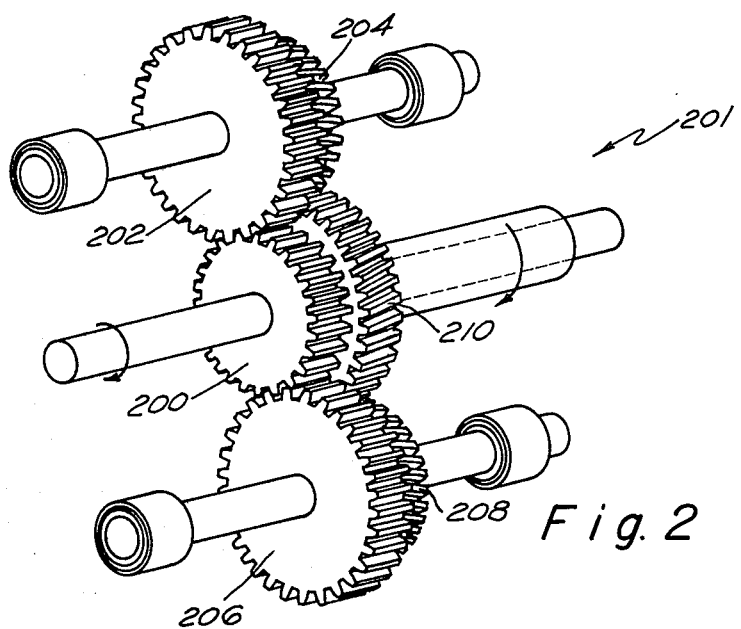
FIG. 2 is a schematic representation of a cluster of gear systems including two or more stages.
Figure 3:
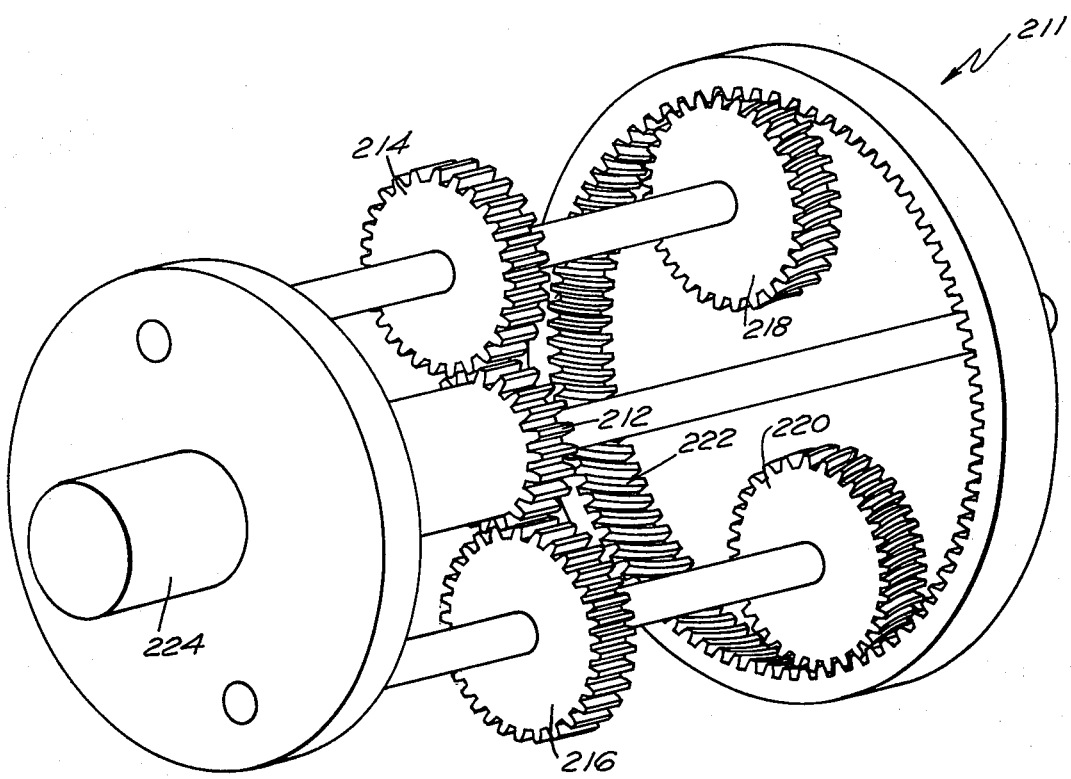
FIG. 3 is another representation of a gear system which includes two or more stages.

Referring to the drawings wherein like reference characters designate like parts throughout the several views and more particularly to FIG. 1 thereof, a multi-cross sectional view of a high pressure air turbine-gear train assembly using the gear tooth alignment technique of subject invention is shown. As shown in FIG. 2, a star cluster 201 of gears includes an input gear or driving gear 200 which drives a first stage gear 202 which drives second stage pinion 204. Simultaneously driving gear 200 also drives another first stage gear 206 which in turn drives the second stage pinion 208 in the star cluster. As shown in FIG. 2, the output gear is 210. Another gear cluster 211 is shown in FIG. 3 wherein the driving gear 212 is driving the first gears 214 and 216. Driving gear 214 drives second stage gear 218 and driving gear 216 drives another second stage gear 220. Gears 218 and 220 interact with ring gear 222 which may be fixed or turning. If ring gear 222 is fixed, the output is given by output planet carrier 224 and the gear system is an epicyclic gear system. On the other hand if the ring gear is turning and planet carrier 224 is fixed, the arrangement 211 becomes another form of a cluster gear assembly. As shown in FIG. 1, the gear teeth of first stage gear 84 and second stage pinion 96 are hardened and ground separately and fitted with a transition fit between the shaft of gear 84 and the bore of pinion 96.

A fixture is used in the welding process to ensure that one tooth of gear 84 is located within preferably ± 0.005 inches of one tooth of gear 96. There is a slight interference fit over area designated as 134 between the two elements. Gears 84 and 96 are electron beam welded together to form a cluster. Area 134 is designed to operate at a stress level between the yield point of the shaft material at the annealed state and the yield point of the material in the work hardened state. After assembling the gear train system as shown in FIG. 1, and with the forward turbine assembly removed, the output shaft portion of planet carrier assembly 114 is locked to the gear case 114 and input sun gear 72 is torsionally loaded to 10 percent greater than the designed maximum operating load including dynamic loads. This causes the stress at the annealed welded area 134 to exceed the yield point and there is a permanent torsional deformation of all gears. The deformation is greater for those gears having the greatest positive error in tooth placement. This one cycle results in hardening the welded area designated as 134 so that subsequent loading and actual operation will not exceed the apparent yield strength. This is shown graphically in FIG. 4 which is a graphical representation of torsional stress versus strain for three electron beam welded samples of turbine-gear train planet clusters. Dotted curves 230, 232 and 234 represent the first stress cycle for the three different samples whereas solid curves 236, 238 and 240 represent the second stress cycle for each of the three different samples. The curves clearly indicate that the first stress cycle results in work hardening of the welded area of the samples so that the subsequent loading in actual operation will not exceed the apparent yield strength.

Briefly stated, gear tooth alignment by strain in case of a gear cluster assembly includes fitting of two hardened and separately ground gears with an easy fit between the shafts of one gear and the bore of the other. A fixture is used in a welding process to insure reasonable positional accuracy between the teeth of two gears of a cluster joined by welding. The welded area develops a weakness resulting from being annealed due to heating in the welded zone. After assembling into a gear train system, the output shaft is locked to the gear case structure, the input gear is loaded torsionally slightly greater than the designed maximum working load causing the stress to exceed the yield point at the annealed welded area and a permanent deformation of all gears results with work hardening of the welded area during one cycle and repositioning of the teeth permanently.

Obviously many modifications and variations of the present invention may become apparent in the light of above teachings. As an example, the amount of stress applied during first cycle and second cycle can be varied depending upon the type of material used for the gears involved. Furthermore, the area of the welded zone in forming of the cluster assembly may be varied to control the stress level depending upon the materials used in making the gear assembly. The subsequent heating and annealing in a selective area and work hardening of the selected area by strain may also be accomplished without deviating from the teachings of subject invention. It is therefore understood that within the scope of the appended claims the invention may be practiced otherwise than specifically described.

I claim:

1. A method of gear tooth alignment of a planet gear cluster of more than one stage in a multi-cluster gear train assembly, including a plurality of planet gear clusters and a ring gear, comprising the steps of:
   assembling the first stage gear and the second stage pinion of the planet gear cluster with a transition fit in a common area;
   welding the common area;
   assembling the planet gear cluster in a multi-cluster gear train assembly;
   locking the output shaft of the multi-cluster gear train assembly; and
   torsionally loading the input shaft of the multi-cluster gear train assembly beyond the yield point of the welded area to cause a permanent repositioning of all gears.

2. The method of gear tooth alignment of claim 1 which further includes the step of repeating the steps of claim 1 at another welded area in the gear cluster area of the multi-cluster gear train assembly.

3. The method of gear tooth alignment of claim 1 which further includes the steps of heating and annealing the welded area.

* * * * *